US011849857B2

United States Patent
Hitomi

(10) Patent No.: US 11,849,857 B2
(45) Date of Patent: Dec. 26, 2023

(54) COVER MATERIAL FIXING DEVICE AND CONVEYANCE SEAT

(71) Applicant: TS TECH CO., LTD., Asaka (JP)

(72) Inventor: Tsubasa Hitomi, Tochigi (JP)

(73) Assignee: TS TECH CO., LTD., Asaka (JP)

( * ) Notice: Subject to any disclaimer, the term of this patent is extended or adjusted under 35 U.S.C. 154(b) by 64 days.

(21) Appl. No.: 17/428,427

(22) PCT Filed: Feb. 5, 2020

(86) PCT No.: PCT/JP2020/004365
§ 371 (c)(1),
(2) Date: Aug. 4, 2021

(87) PCT Pub. No.: WO2020/162497
PCT Pub. Date: Aug. 13, 2020

(65) Prior Publication Data
US 2022/0104633 A1    Apr. 7, 2022

(30) Foreign Application Priority Data

Feb. 6, 2019  (JP) ................. 2019-020044

(51) Int. Cl.
*B60N 2/58*     (2006.01)
*A47C 31/02*    (2006.01)
*B68G 7/05*     (2006.01)

(52) U.S. Cl.
CPC ............ *A47C 31/02* (2013.01); *B60N 2/5816* (2013.01); *B68G 7/05* (2013.01)

(58) Field of Classification Search
CPC ............... B60N 2/5816; A47C 31/02
(Continued)

(56) References Cited

U.S. PATENT DOCUMENTS 3,981,534 A * 9/1976 Wilton ................ B60N 2/6009
                                                    297/218.1 X
5,478,134 A * 12/1995 Bernard ............... B60N 2/5825
                                                    297/218.1 X
(Continued)

FOREIGN PATENT DOCUMENTS

CN  207617578 A    7/2018
EP    3254969 A1   12/2017
(Continued)

OTHER PUBLICATIONS

International Search Report and Written Opinion with English Translation issued in PCT/JP2020/004365, dated Mar. 31, 2020 (11 pages).

(Continued)

*Primary Examiner* — Rodney B White
(74) *Attorney, Agent, or Firm* — Dority & Manning, P.A.

(57) ABSTRACT

A cover material fixing device includes: a first fixing member that is formed in a plate shape so that the first fixing member is connected to a first cover material at a first connection portion of one end portion and has an insertion portion formed at the other end portion; and a second fixing member that is disposed on a groove portion of a fixed member, is provided along the first fixing member, and includes a holding portion holding the insertion portion. The insertion portion is inserted and engaged with the holding portion so that the first cover material is fixed to the fixed member and the insertion portion of the first fixing member includes a rotation restricting portion for the holding portion.

18 Claims, 11 Drawing Sheets

(58) Field of Classification Search
USPC .............................. 297/218.1, 218.3, 218.5
See application file for complete search history.

(56) References Cited

U.S. PATENT DOCUMENTS

| | | | | |
|---|---|---|---|---|
| 5,820,213 | A * | 10/1998 | Severinski | A47C 31/023 297/218.1 X |
| 5,879,051 | A * | 3/1999 | Cozzani | A47C 31/023 297/218.1 |
| 6,406,093 | B1 * | 6/2002 | Miotto | B60N 2/5825 297/218.5 X |
| 7,891,735 | B2 * | 2/2011 | Oku | B60N 2/5825 297/218.5 |
| 8,157,324 | B2 * | 4/2012 | Matsuzaki | B60N 2/5883 297/218.1 X |
| 8,388,062 | B2 * | 3/2013 | Hennig | B60N 2/5883 297/218.3 |
| 8,733,834 | B2 * | 5/2014 | Palmer | B60N 2/585 297/218.1 X |
| 9,027,994 | B2 * | 5/2015 | Hage-Hassan | B60N 2/5825 297/218.1 X |
| 10,493,880 | B2 * | 12/2019 | Lafferty | B60N 2/5825 |
| 2013/0057035 | A1 * | 3/2013 | Nishiura | B60N 2/7011 297/218.3 |
| 2013/0119730 | A1 * | 5/2013 | Nakagawa | B60N 2/58 297/218.1 |
| 2017/0305316 | A1 | 10/2017 | Lafferty et al. | |

FOREIGN PATENT DOCUMENTS

| | | |
|---|---|---|
| JP | S5862956 U | 4/1983 |
| JP | S62-102499 U | 6/1987 |
| JP | H01143998 U | 10/1989 |
| JP | H06254267 A | 9/1994 |
| JP | 2006298176 A | 11/2006 |
| JP | 2008-006074 A | 1/2008 |
| JP | 2010-005104 A | 1/2010 |
| JP | 2013-102855 A | 5/2013 |
| JP | 2010-005104 A | 1/2021 |
| WO | WO 2011145193 A1 | 11/2011 |

OTHER PUBLICATIONS

Chinese First Office Action (w/ English translation) for corresponding Chinese Application No. 202080010446.6, dated Jul. 21, 2022, 20 pages.

Japanese Notice of Reasons for Refusal (w/ English translation) for corresponding Application No. 2019-020044, dated Aug. 8, 2023, 10 pages.

* cited by examiner

COVER MATERIAL FIXING DEVICE AND CONVEYANCE SEAT

CROSS REFERENCE TO RELATED APPLICATIONS

This application is the U.S. national stage entry of International Application No. PCT/JP2020/004365 filed under the Patent Cooperation Treaty and having a filing date of Feb. 5, 2020, which claims priority to Japanese Patent Application No. 2019-020044 having a filing date of Feb. 6, 2019, which are incorporated herein by reference.

TECHNICAL FIELD

The present invention relates to a cover material fixing device and a conveyance seat and particularly to a conveyance seat including a cover material fixing device fixing a cover material covering a pad member.

BACKGROUND ART

Generally, in a vehicle seat, a seat cushion which is a seating portion supporting the buttocks and thighs of an occupant and a seat back which is a backrest supporting the back of the occupant are formed by placing a pad member on a seat frame and covering the pad member with a cover material.

For locking a cover material terminal in such a vehicle seat, for example, as described in PATENT LITERATURE 1, there is known a technique of inserting a fixing member provided along an end portion of a cover material into a groove portion of a fixed member and hooking and fixing a locking portion of the fixing member to a locking portion of the fixed member. At this time, the cover material is fixed to the fixed member in such a manner that a rotation preventing portion of the fixing member abuts against a rotation preventing wall of the fixed member.

CITATION LIST

Patent Literature

PATENT LITERATURE 1: JP 2013-102855 A

SUMMARY OF INVENTION

Technical Problem

However, in the above-described cover material fixing device, since the rotation preventing portion is disposed on the side opposite to the locking portion in the thickness direction of the fixing member, specifically, the width direction of the vehicle seat, the cover material fixing device increases in size in the width direction of the vehicle seat (in other words, the thickness direction of the fixing member). Thus, there has been a demand for a cover material fixing device that suppresses an increase in size of the fixing member in a predetermined direction such as a width direction of the vehicle seat.

The present invention has been made in view of the above-described problems and an object thereof is to provide a cover material fixing device and a conveyance seat capable of preventing a fixing member provided at an end portion of a cover material from being separated from a fixed member while suppressing an increase in size in a predetermined direction such as a width direction of a vehicle seat.

Solution to Problem

The above-described problems are solved by a cover material fixing device of the present invention including: a first fixing member that is formed in a plate shape so that the first fixing member is connected to a first cover material at a first connection portion of one end portion and includes an insertion portion formed at the other end portion; and a second fixing member that is disposed on a groove portion of a fixed member, is provided along the first fixing member, and includes a holding portion holding the insertion portion, wherein the insertion portion is inserted and engaged with the holding portion so that the first cover material is fixed to the fixed member, and wherein the insertion portion of the first fixing member includes a rotation restricting portion for the holding portion.

In the cover material fixing device of the present invention with the above-described configuration, since the insertion portion includes the rotation restricting portion for the holding portion, it is possible to suppress the insertion portion from being separated from the holding portion when the first fixing member is pulled in the rotation direction while suppressing an increase in size in a predetermined direction.

Further, in the above-described configuration, the insertion portion may be fitted and held by the holding portion in a thickness direction of the first fixing member.

In the above-described configuration, since the insertion portion is fitted and held by the holding portion, it is possible to suppress the insertion portion from being separated from the holding portion when the first fixing member is pulled in the rotation direction.

Further, in the above-described configuration, the insertion portion may include a cover material contact surface which is formed on one surface in a thickness direction of the first fixing member to be in contact with the first cover material and include a protruding surface protruding toward a surface on the side opposite to the cover material contact surface.

In the above-described configuration, since the insertion portion protrudes toward the side opposite to the first cover material, it is possible to make the cover material contact surface flat and to easily insert the first fixing member into the second fixing member.

Further, in the above-described configuration, the first fixing member may include a first locking portion which is formed between the insertion portion and the first connection portion to protrude toward the same side as that of the protruding surface, the second fixing member may include a locking end portion which is formed at an end portion disposed on the side facing the protruding surface to protrude toward the first fixing member while the insertion portion is held by the holding portion, and the locking end portion may engage with a concave portion between the insertion portion and the first locking portion.

In the above-described configuration, since the second fixing member is fitted to the concave portion of the first fixing member while restricting the rotation of the first fixing member by the rotation restricting portion, it is more difficult to separate the first fixing member from the second fixing member.

Further, in the above-described configuration, the holding portion may include a base portion which is supported while being in contact with the groove portion, an extension portion which extends from the base portion in a thickness direction of the first fixing member, and a second locking portion which is bent from the extension portion, extends in substantially parallel to the base portion, and locks the insertion portion. In the insertion portion, a surface on the side of the first cover material may be formed in substantially parallel to a surface on the side opposite to the first cover material. Then, in the insertion portion, a surface on the side of the first cover material may be in contact with the base portion and a surface on the side opposite to the first cover material may be in contact with the second locking portion between the base portion and the second locking portion.

In the above-described configuration, since the substantially parallel surfaces of the holding portion and the insertion portion are in contact with each other, there is no gap for the insertion portion to rotate.

Further, in the above-described configuration, the first connection portion may be formed to be thinner than the insertion portion in a thickness direction.

In the above-described configuration, since the thickness of the first connection portion is thinner than the thickness of the insertion portion, the first fixing member and the first cover material are easily connected at the first connection portion.

Further, in the above-described configuration, the second fixing member may be connected to a second cover material different from the first cover material at a second connection portion, and the second cover material may be disposed between the first fixing member and the second fixing member and extend to a position where the insertion portion and the holding portion overlap each other in a height direction of the first fixing member.

In the above-described configuration, it is possible to bury a gap between the insertion portion and the holding portion with the second cover material when the insertion portion is inserted into the holding portion and to increase an engagement force between the insertion portion and the holding portion.

Further, in the above-described configuration, the first cover material and the second cover material may be inserted between the second fixing member and the first fixing member, and an elastic slab may be provided as a backing cloth on a back surface side of at least one of the first cover material and the second cover material.

In the above-described configuration, a gap between the insertion portion and the holding portion is elastically absorbed by an elastic slab while the insertion portion is inserted into the holding portion.

Furthermore, in the above-described configuration, the first connection portion of the first fixing member may be bent in a direction opposite to the protruding direction of the insertion portion.

In the above-described configuration, it is possible to improve a locking force between the first locking portion of the insertion portion and the locking end portion of the holding portion due to the repulsive force caused by the bending of the first connection portion of the insertion portion while the insertion portion is held by the holding portion.

Further, the above-described problems are solved by a conveyance seat of the present invention including: the cover material fixing device; a seat back; and a seat cushion, wherein the seat back includes a back frame, a back pad placed on the back frame, and a back cover material covering the back pad, wherein the seat cushion includes a cushion frame, a cushion pad placed on the cushion frame, and a cushion cover material covering the cushion pad, wherein the fixed member is the back pad or the cushion pad, and wherein a contact surface in which the second fixing member is in contact with the fixed member is disposed between the insertion portion and the back frame or the cushion frame.

In the conveyance seat of the present invention with the above-described configuration, a force applied to the second fixing member is supported by the frame when the insertion portion is pulled to the cover material while the insertion portion is inserted into the holding portion.

Advantageous Effects of Invention

According to the cover material fixing device of the present invention, since the insertion portion includes the rotation restricting portion for the holding portion, it is possible to suppress the insertion portion from being separated from the holding portion when the first fixing member is pulled in the rotation direction while suppressing an increase in size of the fixing member in a predetermined direction.

Further, according to the cover material fixing device of the present invention, since the insertion portion is fitted and held by the holding portion, it is possible to suppress the insertion portion from being separated from the holding portion when the first fixing member is pulled in the rotation direction.

Further, according to the cover material fixing device of the present invention, since the insertion portion protrudes toward the side opposite to the first cover material, it is possible to make the cover material contact surface flat and to easily insert the first fixing member into the second fixing member.

Further, according to the cover material fixing device of the present invention, since the second fixing member is fitted to the concave portion of the first fixing member while the rotation of the first fixing member is restricted by the rotation restricting portion, it is more difficult to separate the first fixing member from the second fixing member.

Further, according to the cover material fixing device of the present invention, since the substantially parallel surfaces of the holding portion and the insertion portion are in contact with each other, there is no gap for the insertion portion to rotate.

Further, according to the cover material fixing device of the present invention, since the thickness of the first connection portion is thinner than the thickness of the insertion portion, the first fixing member and the first cover material are easily connected at the first connection portion.

Further, according to the cover material fixing device of the present invention, it is possible to bury a gap between the insertion portion and the holding portion with the second cover material when the insertion portion is inserted into the holding portion and to increase an engagement force between the insertion portion and the holding portion.

Further, according to the cover material fixing device of the present invention, it is possible to improve a locking force between the first locking portion of the insertion portion and the locking end portion of the holding portion due to the repulsive force caused by the bending of the first connection portion of the insertion portion while the insertion portion is held by the holding portion.

Further, according to the cover material fixing device of the present invention, a gap between the insertion portion and the holding portion is elastically absorbed by an elastic slab while the insertion portion is inserted into the holding portion.

Further, according to the conveyance seat of the present invention, a force applied to the second fixing member is supported by the frame when the insertion portion is pulled to the cover material while the insertion portion is inserted into the holding portion.

DESCRIPTION OF EMBODIMENTS

Hereinafter, a conveyance seat according to modes for carrying out the present invention (hereinafter, embodiments) will be described with reference to FIGS. 1 to 8. A vehicle seat mounted on a vehicle as a conveyance seat according to the embodiment will be described as an example, but the present invention is not limited to the vehicle seat.

Additionally, the embodiments to be described below are merely examples to facilitate the understanding of the present invention and do not limit the present invention. That is, the shapes, dimensions, arrangements, and the like of the members to be described later can be modified and improved without departing from the spirit of the present invention and the present invention includes, of course, the equivalents thereof.

In the description below, the "front to back direction" means the front to back direction when viewed from the seated occupant of the vehicle seat and matches the travel direction of the vehicle. The "seat width direction" means the traverse width direction of the vehicle seat and matches the right and left direction when viewed from the seated occupant of the vehicle seat. Further, the "up and down direction" means the height direction of the vehicle seat and matches the up and down direction when the vehicle seat is viewed from the front side. The "seat inward direction" means the inward direction of the vehicle seat (the direction directed toward the center of the vehicle seat).

1. Configuration of Vehicle Seat S

Figure 1:
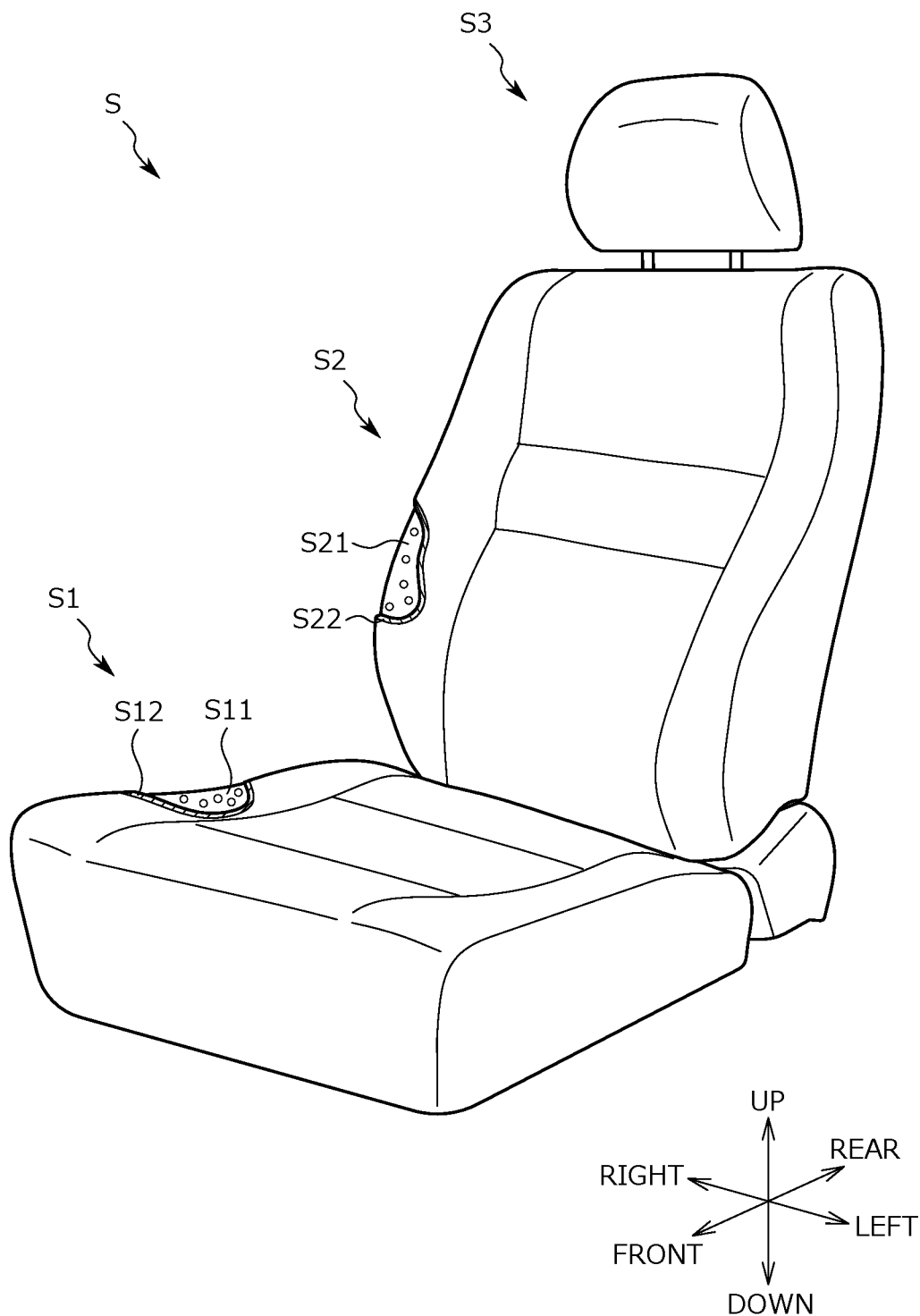
FIG. 1 is an external view of a vehicle seat according to an embodiment of the present invention.

A vehicle seat S according to the embodiment has an appearance illustrated in FIG. 1. Additionally, in FIG. 1, a part of the vehicle seat S, specifically, right end portions of a seat cushion S1 and a seat back S2 is shown in a configuration in which a cushion cover material S12 and aback cover material S22 are removed for convenience of description.

The vehicle seat S mainly includes the seat cushion S1 which is a seating portion for supporting the buttocks of the seated occupant, the seat back S2 which is a backrest for supporting the back of the seated occupant, and a headrest S3 which is disposed at the upper portion of the seat back S2 and supports the head of the seated occupant. The seat cushion S1 has a configuration in which a cushion pad S11 is placed on a cushion frame (not illustrated) and further the cushion pad S11 is covered with the cushion cover material S12.

Figure 2:
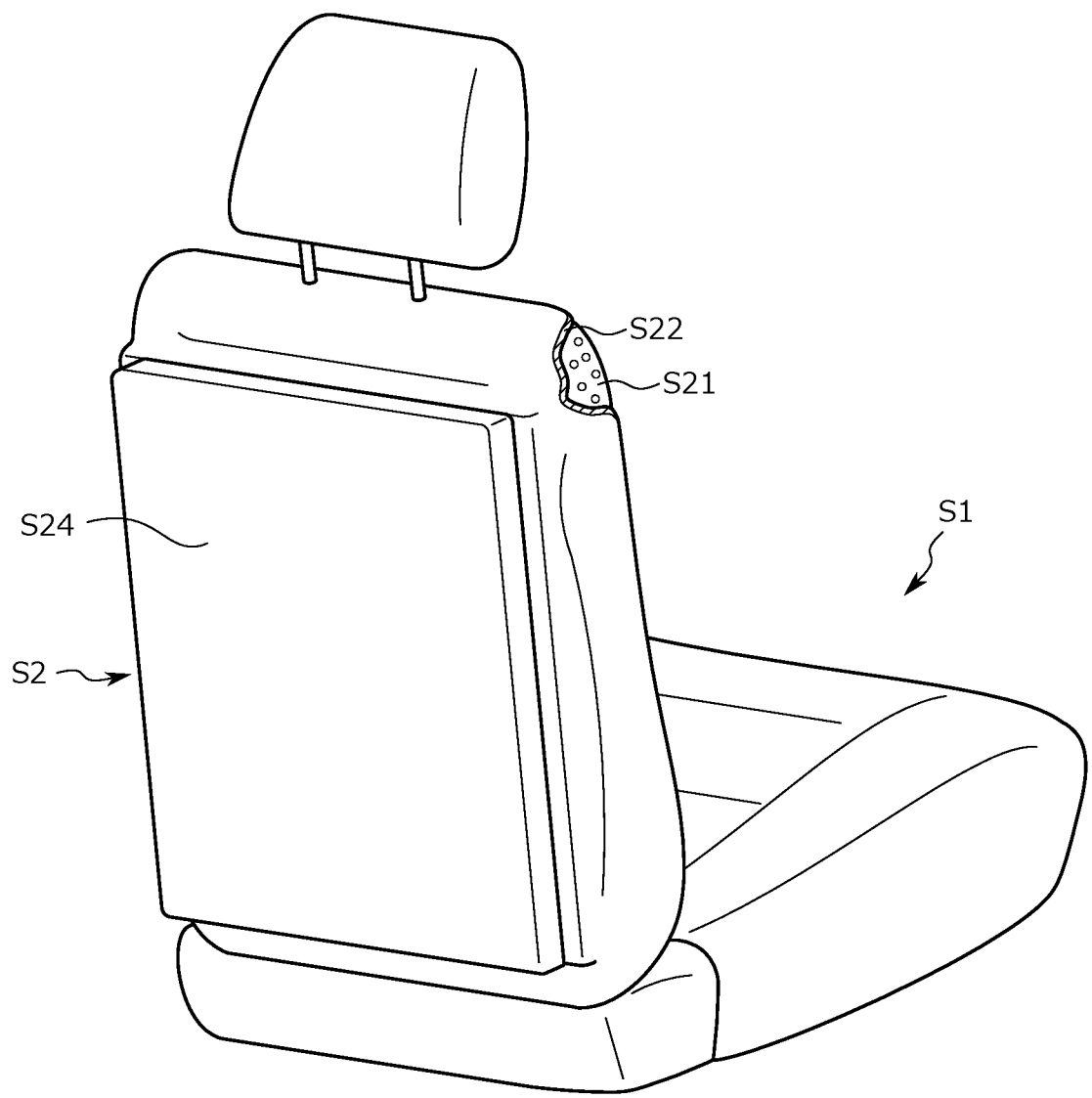
FIG. 2 is a perspective view of a back surface of the vehicle seat according to an embodiment of the present invention.
Figure 3:
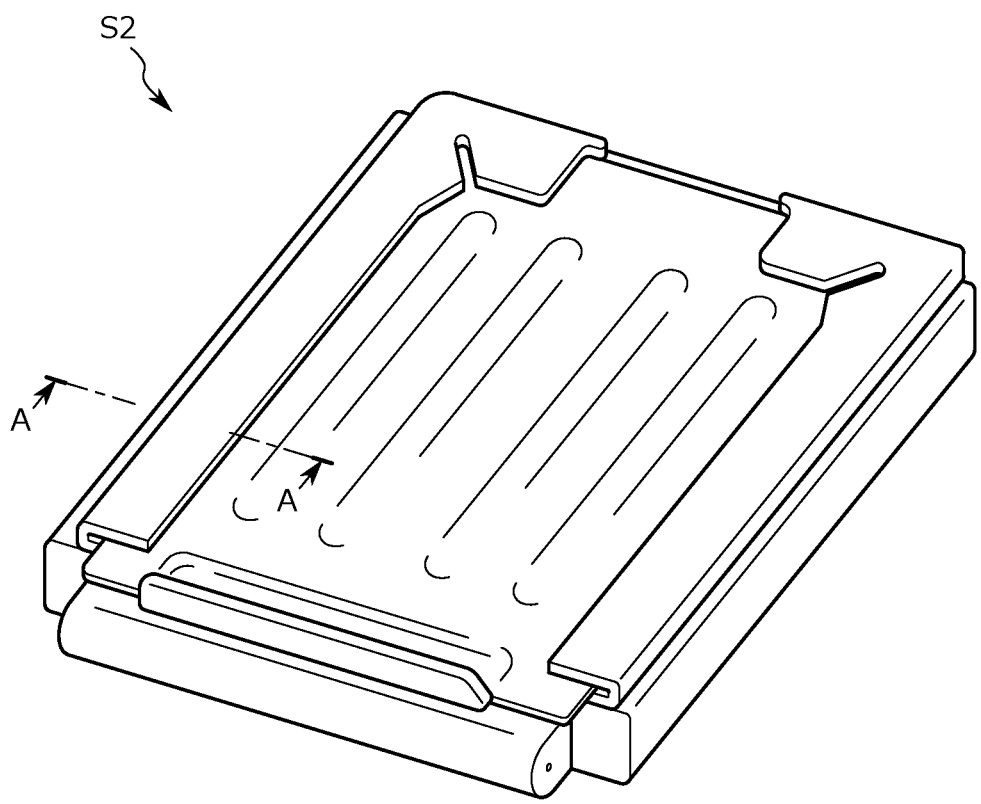
FIG. 3 is a perspective view illustrating a back surface of a seat back according to an embodiment of the present invention.
Figure 3:
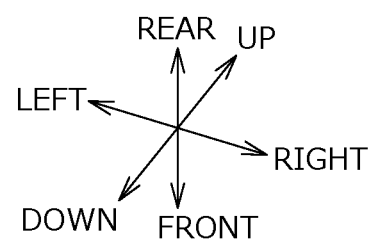

The seat back S2 has a configuration in which a back pad S21 is placed on a back frame S23 to be described later and further the back pad S21 is covered with the back cover material S22. As illustrated in FIG. 2, a back surface located behind the seat back S2 is closed with a backboard S24. FIG. 3 illustrates a state of the seat back S2 with the backboard S24 removed.

Figure 4:
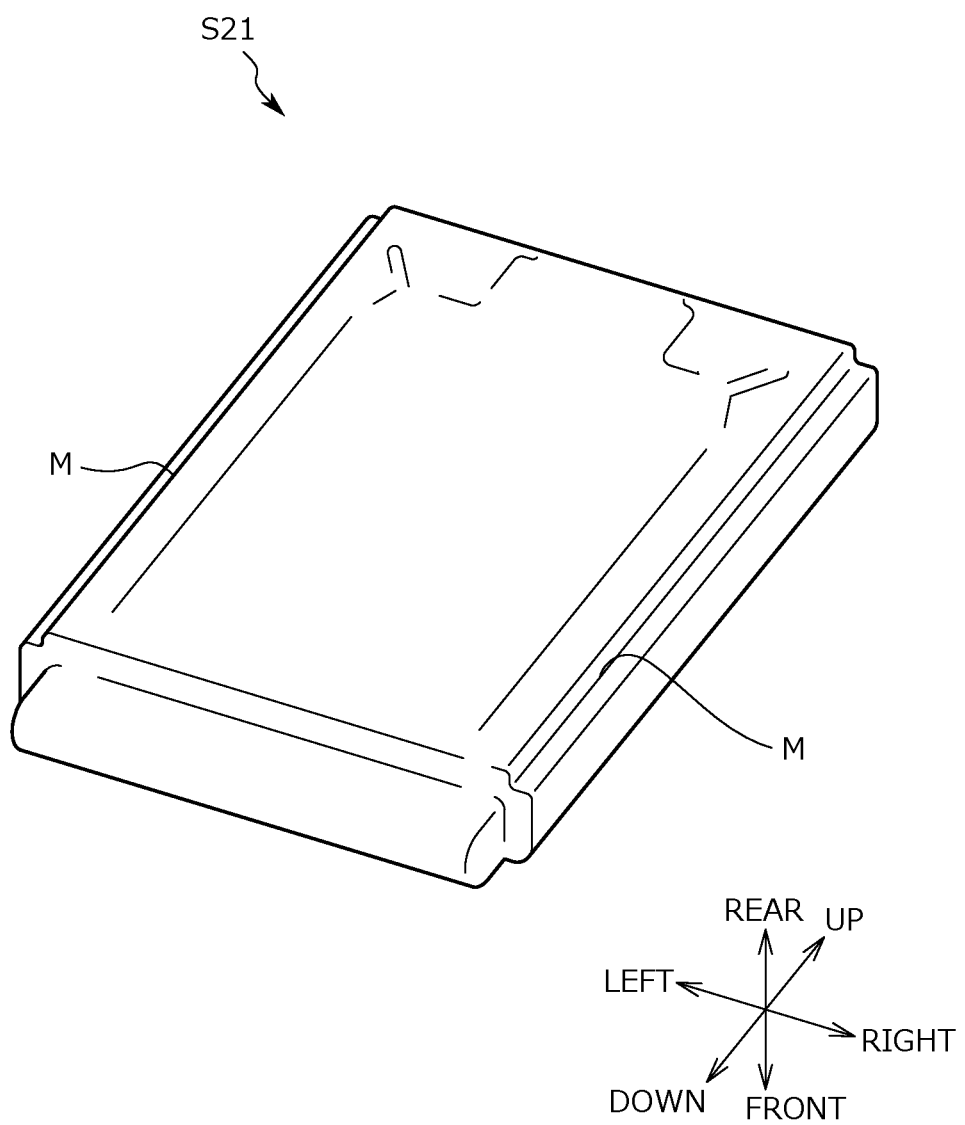
FIG. 4 is a perspective view illustrating a back pad of the vehicle seat according to an embodiment of the present invention.

As illustrated in FIG. 4, both end portions of the back pad S21 of the seat back S2 in the seat width direction are provided with a pair of groove portions M extending in the up and down direction of the conveyance seat. More specifically, the back pad S21 includes the pair of grooves portions M extending in the up and down direction of the conveyance seat at a position on the rear side of the conveyance seat in the front to back direction and both end portions in the seat width direction. A second fixing member 20 of a cover material fixing device K to be described later is attached along the groove portion M.

The cushion pad S11 and the back pad S21 are made of an elastic cushion material such as urethane foam, the cushion cover material S12 and the back cover material S22 are made of synthetic leather, cloth, or the like, and a plurality of cover materials are sewn to form the cushion pad S11 and the back pad S21.

2. Configuration of Cover Material Fixing Device

Figure 5A:
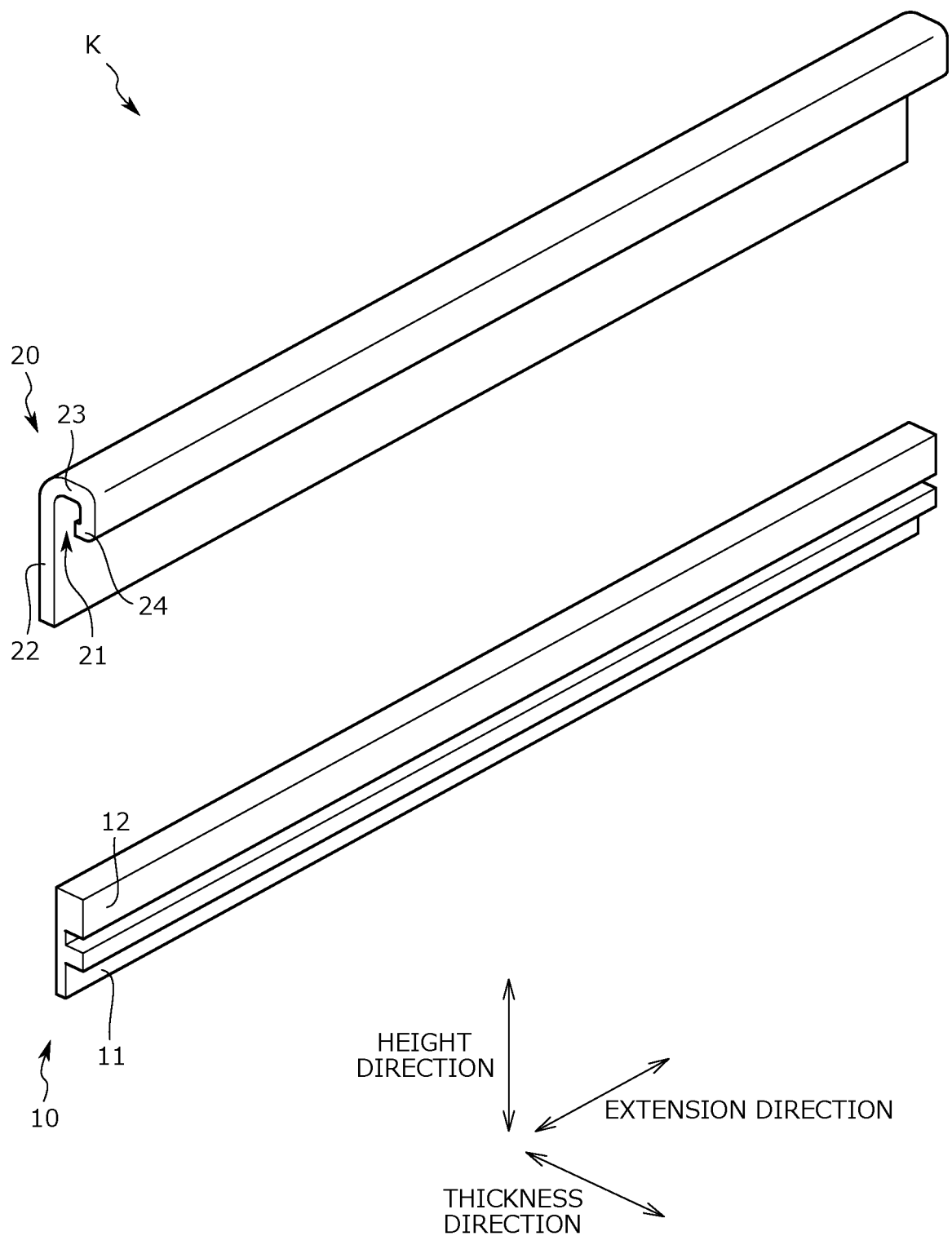
FIG. 5A is a perspective view illustrating a cover material fixing device according to an embodiment of the present invention.
Figure 5B:
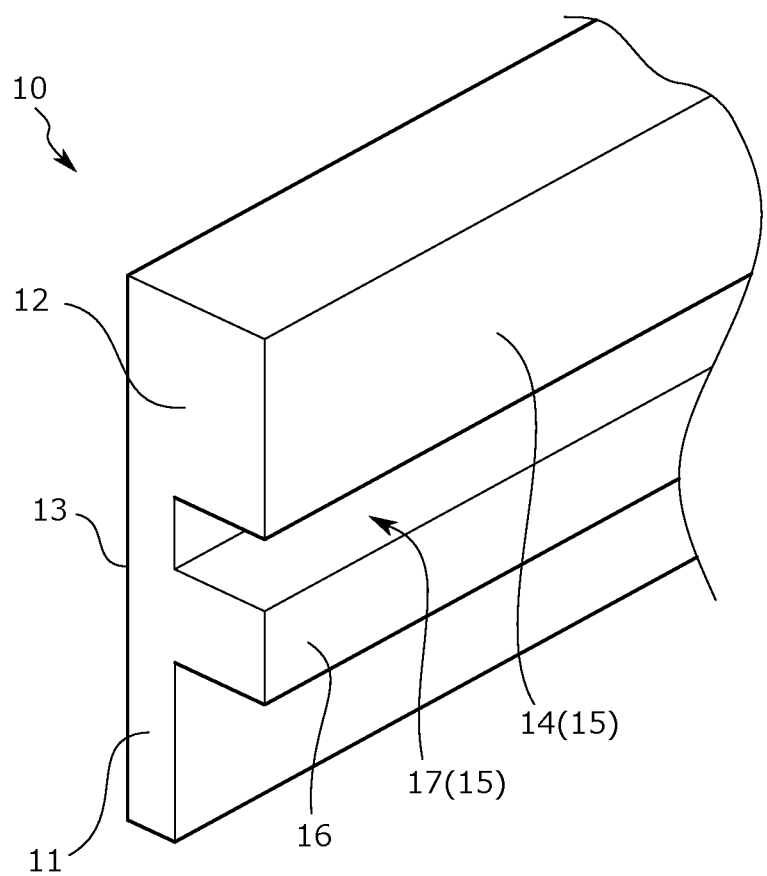
FIG. 5B is an explanatory diagram illustrating a configuration of a first fixing member according to an embodiment of the present invention.
Figure 5B:
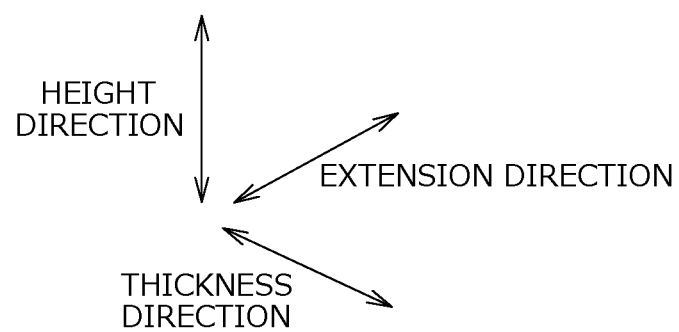
Figure 5C:
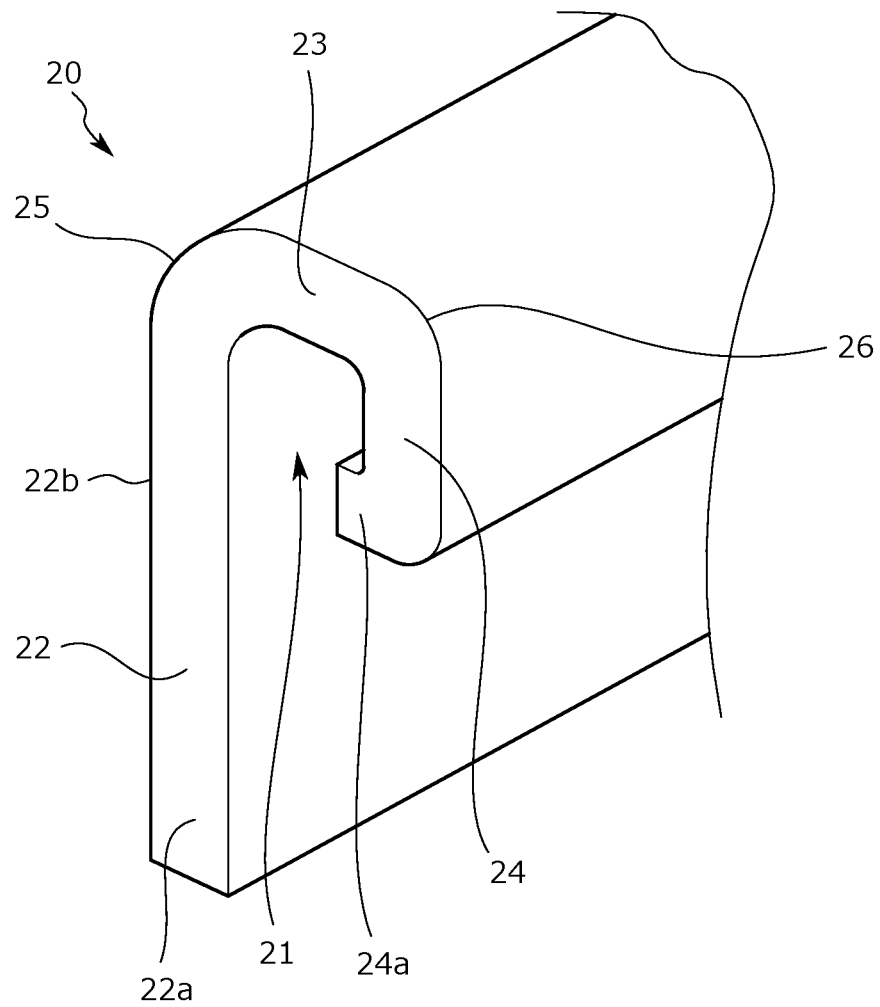
FIG. 5C is an explanatory diagram illustrating a configuration of a second fixing member according to an embodiment of the present invention.
Figure 5C:
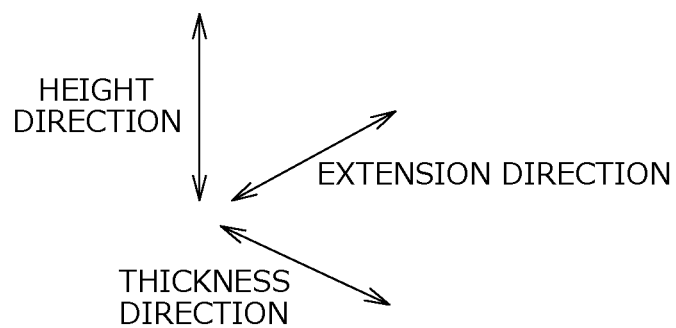
Figure 6:
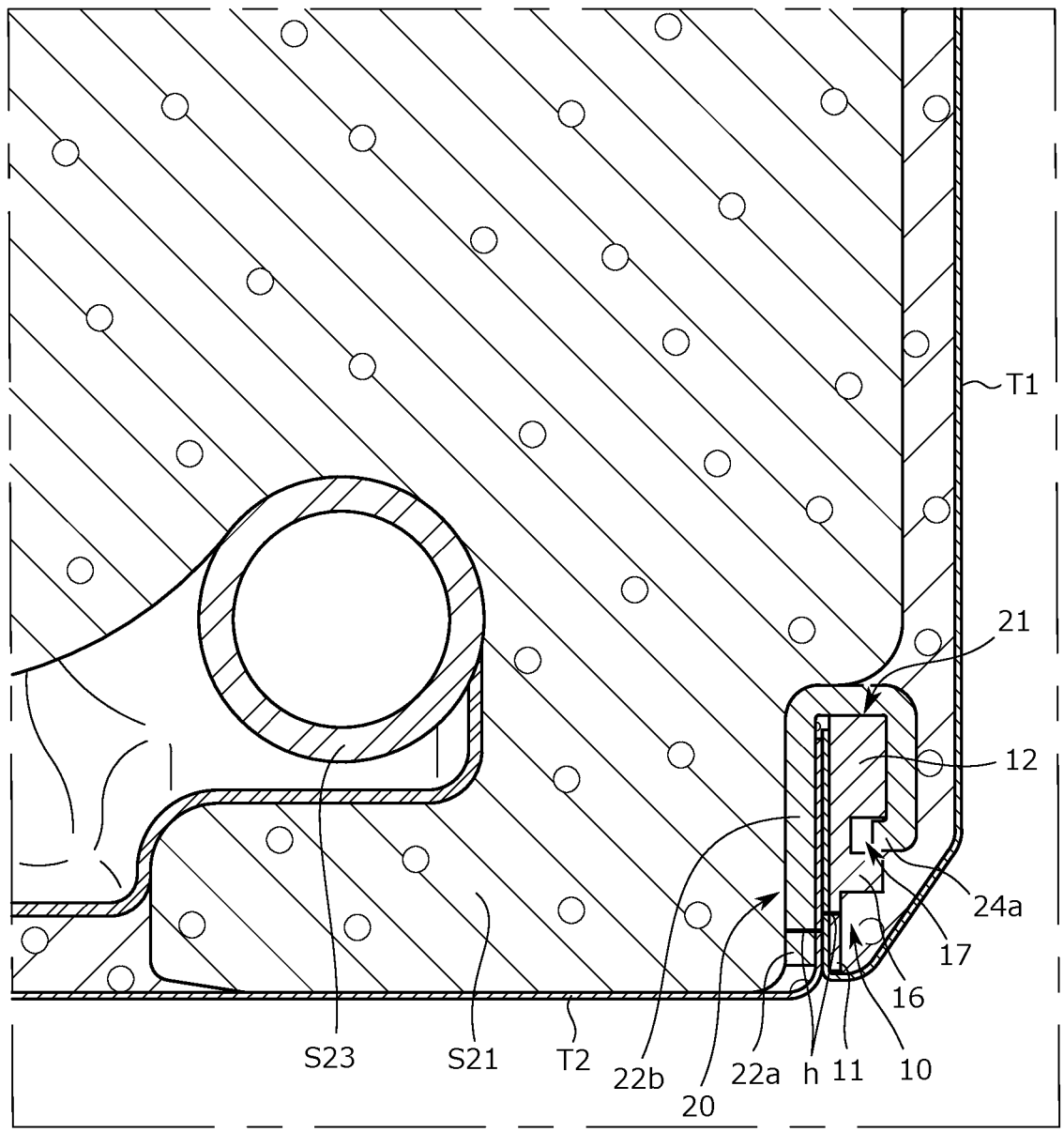
FIG. 6 is a view illustrating a cross-section A-A of FIG. 3.

Hereinafter, the cover material fixing device K that fixes the back cover material S22 of the seat back S2 provided in the vehicle seat S according to the embodiment to the back pad S21 will be described with reference to FIGS. 5A to 6. FIG. 5A is a perspective view illustrating the cover material fixing device K, FIG. 5B is an explanatory diagram illustrating a configuration of the first fixing member 10, and FIG. 5C is an explanatory diagram illustrating a configuration of the second fixing member 20. FIG. 6 is a view illustrating a cross-section A-A of FIG. 3.

As will be described later, the back cover material S22 includes a first cover material T1 and a second cover material T2. The cover material fixing device K of the embodiment mainly includes the first fixing member 10 connected to the first cover material T1 and the second fixing member 20 attached to the back pad S21 as the fixed member. The first fixing member 10 and the second fixing member 20 are a pair of corresponding elongated members and can be formed by, for example, a resin material such as polypropylene.

(First Fixing Member 10)

As illustrated in FIGS. 5A, 5B, and 6, the first fixing member 10 is an elongated plate-shaped member in which the first cover material T1 is connected at the first connection portion 11 of one end portion and an insertion portion 12 is formed at the other end portion (the first cover material T1 is sewn to the first connection portion 11 at the suture line h). Here, the thickness direction of the first fixing member 10 is a direction orthogonal to the extension direction of the first fixing member 10. Further, the height direction of the first fixing member 10 is a direction orthogonal to the thickness direction and the extension direction of the first fixing member 10.

The first fixing member 10 has a substantially F-shaped cross-section. The first connection portion 11 is formed to be thinner than the insertion portion 12 in the thickness direction of the first fixing member 10. Since the thickness of the first connection portion 11 is thinner than the thickness of the insertion portion 12, the first fixing member 10 and the first cover material T1 are easily connected to the first connection portion 11.

As illustrated in FIG. 6, a surface on the side of the first cover material T1 in the insertion portion 12 is formed to be substantially parallel to a surface on the side opposite to the first cover material T1. More specifically, the insertion portion 12 includes a cover material contact surface 13 which is formed on one surface in the thickness direction of the first fixing member 10 to be in contact with the first cover material T1. Further, the insertion portion 12 includes a protruding surface 14 protruding toward a surface on the side opposite to the cover material contact surface 13. Then, as illustrated in FIGS. 5B and 6, the cover material contact surface 13 and the protruding surface 14 are substantially parallel to each other. In this way, when the insertion portion 12 protrudes toward the side opposite to the first cover material T1, the cover material contact surface 13 can be made flat and the first fixing member 10 can be easily inserted into the second fixing member 20.

As illustrated in FIG. 5B, the first fixing member 10 includes a first locking portion 16 which is provided between the insertion portion 12 and the first connection portion 11 in the height direction to protrude toward the same side as that of the protruding surface 14. The insertion portion 12 of the first fixing member 10 includes a rotation restricting portion 15 for a holding portion 21. Here, the rotation restricting portion 15 includes a concave portion 17 and the protruding surface 14 of the insertion portion 12. Additionally, the concave portion 17 is provided between the insertion portion 12 and the first locking portion 16 and is recessed from the protruding surface 14 toward the cover material contact surface 13. The insertion portion 12 is formed to be larger than the first locking portion 16 in the height direction of the first fixing member 10.

(Second Fixing Member 20)

As illustrated in FIGS. 5B, 5C, and 6, the second fixing member 20 is disposed on the groove portion M of the back pad S21 which is a fixed member and is provided along the first fixing member 10. The second fixing member 20 includes the holding portion 21 which holds the insertion portion 12 of the first fixing member 10.

As illustrated in FIG. 5C, the holding portion 21 includes a base portion 22 which is supported while being in contact with the groove portion M, an extension portion 23 which extends from the base portion 22 in the thickness direction of the first fixing member 10, and a second locking portion 24 which is bent from the extension portion 23 and extends in a direction substantially parallel to the base portion 22. The second locking portion 24 includes a locking end portion 24a which locks the insertion portion 12. The locking end portion 24a is formed to be bent from the second locking portion 24 toward the holding portion 21, in other words, toward the base portion 22 in the thickness direction. As illustrated in FIG. 6, the second fixing member 20 is connected to the second cover material T2 different from the first cover material T1 at the second connection portion 22a (the second cover material T2 is sewn to the second connection portion 22a at the suture line h).

As illustrated in FIG. 5C, in the holding portion 21, a first curved portion 25 is formed between the base portion 22 and the extension portion 23 and a second curved portion 26 is formed between the extension portion 23 and the second locking portion 24. When the first curved portion 25 is formed so that a curvature radius is larger than that of the second curved portion 26, it is suitable because the engagement state of the insertion portion 12 in the holding portion 21 becomes stable.

As illustrated in FIG. 6, a contact surface 22b in which the second fixing member 20 is in contact with the back pad S21 as the fixed member is disposed between the insertion portion 12 and the back frame S23 (the pipe frame constituting the seat back S2 and extending in the up and down direction). According to such a configuration, when the insertion portion 12 is pulled to the first cover material T1 while the insertion portion 12 is inserted into the holding portion 21, a force applied to the second fixing member 20 is supported by the back frame S23. Accordingly, the engagement state between the first fixing member 10 and the second fixing member 20 is stably supported.

3. Action of Cover Material Fixing Device

Figure 7A:
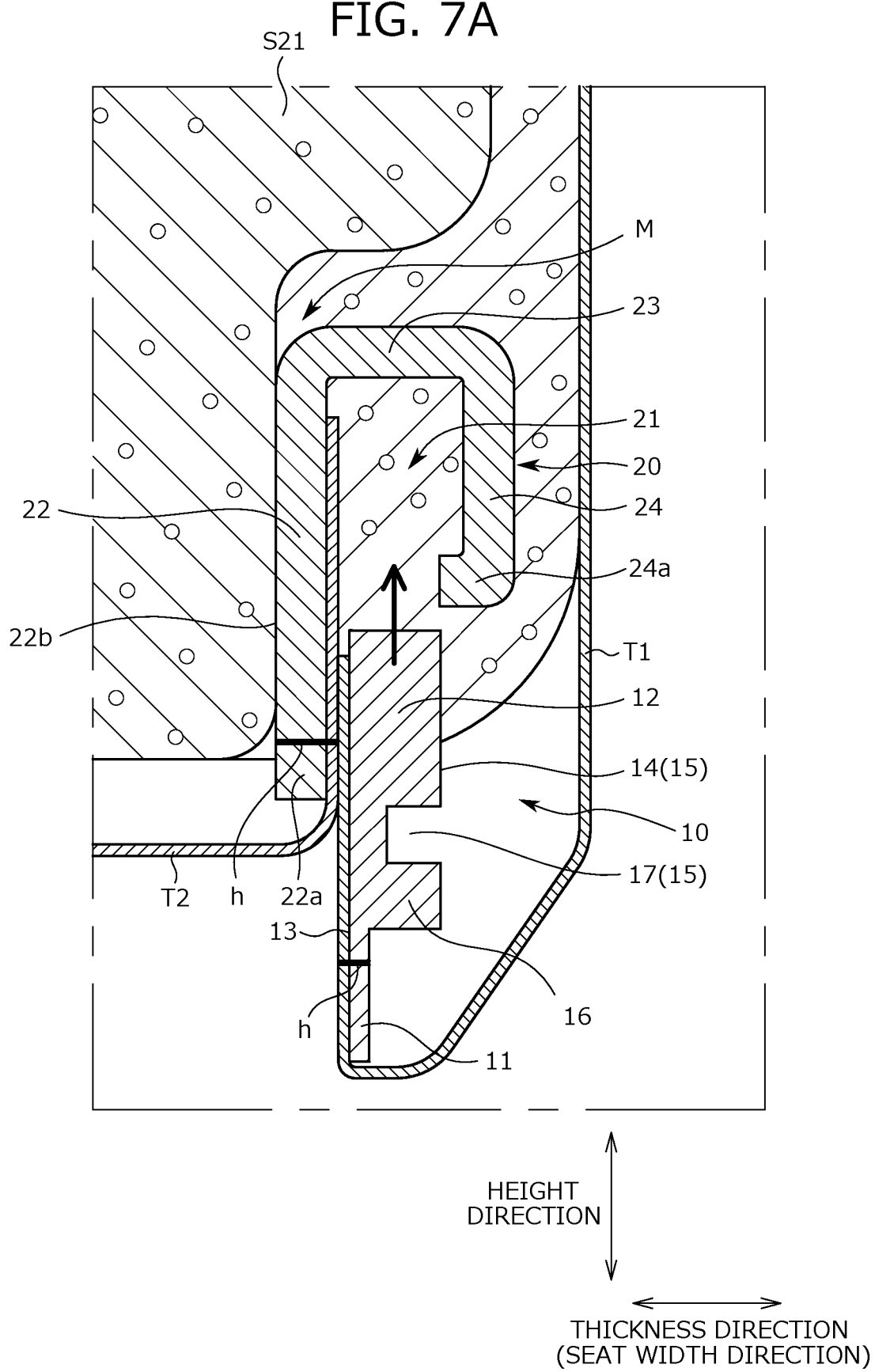
FIG. 7A is a view illustrating a cross-section of a seat back corresponding to a cross-section A-A of FIG. 3 and is an explanatory diagram illustrating a step before attaching the first fixing member to the second fixing member according to an embodiment of the present invention.
Figure 7B:
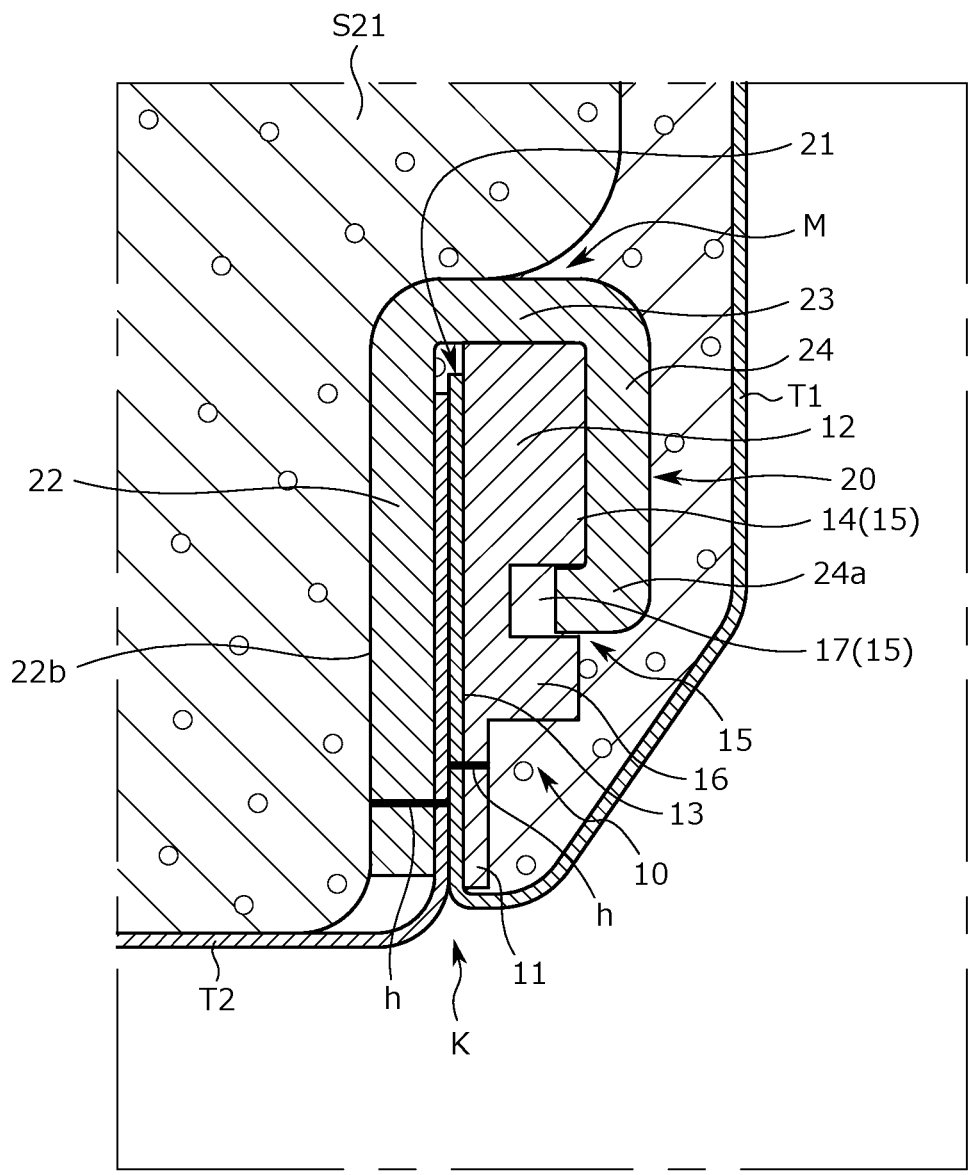
FIG. 7B is an enlarged view illustrating a cross-section A-A of FIG. 3 and is an explanatory diagram illustrating a state in which the first fixing member engages with the second fixing member according to an embodiment of the present invention.

Hereinafter, an action of the cover material fixing device K will be described with reference to FIGS. 7A and 7B. FIGS. 7A and 7B are enlarged views illustrating a cross-section A-A of FIG. 3 and are diagrams illustrating a process in which the first fixing member 10 engages with the second fixing member 20 according to the embodiment. As illustrated in FIG. 7B, the insertion portion 12 is fitted and held by the holding portion 21 in the thickness direction (corresponding to the seat width direction) of the first fixing member 10. The insertion portion 12 is inserted and engaged with the holding portion 21 so that the first cover material T1 is fixed to the back pad S21.

In the cover material fixing device K of the embodiment, the insertion portion 12 of the first fixing member 10 includes the rotation restricting portion 15 (specifically, the protruding surface 14 and the concave portion 17) for the holding portion 21. According to such a configuration, it is possible to suppress an increase in size in a predetermined direction (the thickness direction of the first fixing member 10). Further, it is possible to suppress the insertion portion 12 from being separated from the holding portion 21 when the first fixing member 10 is pulled in the rotation direction. Specifically, since the insertion portion 12 is fitted and held by the holding portion 21, it is possible to suppress the insertion portion 12 from being separated from the holding portion 21 when the first fixing member 10 is pulled in the rotation direction.

In the second fixing member 20, an end portion disposed on the side facing the protruding surface 14 while the insertion portion 12 is held by the holding portion 21 is provided with the locking end portion 24a formed to protrude from the second locking portion 24 toward the first fixing member 10. The locking end portion 24a is fitted to the concave portion 17 between the insertion portion 12 and the first locking portion 16. According to such a configuration, since the second fixing member 20 is fitted to the concave portion 17 of the first fixing member 10 while restricting the rotation of the first fixing member 10 by the rotation restricting portion 15 (specifically, the protruding surface 14), it is more difficult to separate the first fixing member 10 from the second fixing member 20.

In the insertion portion 12 of the first fixing member 10, a surface on the side of the first cover material T1 is adjacent to the base portion 22 through the first cover material T1 and the second cover material T2 and a surface on the side opposite to the first cover material T1 is in contact with the second locking portion 24 between the base portion 22 and the second locking portion 24 in the seat width direction. According to such a configuration, a gap for rotating the insertion portion 12 disappears since the substantially parallel surfaces of the holding portion 21 and the insertion portion 12 are in contact with each other.

As illustrated in FIG. 7B, the second cover material T2 is disposed between the first fixing member 10 and the second fixing member 20 and extends to a position where the insertion portion 12 and the holding portion 21 overlaps each other in the height direction of the first fixing member 10 while the first fixing member 10 engages with the second fixing member 20. According to such a configuration, it is possible to bury a gap of the holding portion 21 which may be generated between the insertion portion 12 and the holding portion 21 when the insertion portion 12 is inserted into the holding portion 21 by the second cover material T2 and to increase the engagement force between the insertion portion 12 and the holding portion 21.

As illustrated in FIG. 7B, the first cover material T1 and the second cover material T2 are inserted between the second fixing member 20 and the first fixing member 10 while the first fixing member 10 engages with the second fixing member 20. At this time, it is preferable that an elastic slab is provided as a backing cloth (not illustrated) on the back surface side of at least one of the first cover material T1 and the second cover material T2. According to such a configuration, a gap between the insertion portion 12 and the holding portion 21 is elastically absorbed by an elastic slab while the insertion portion 12 is inserted into the holding portion 21.

4. Modified Example

Figure 8:
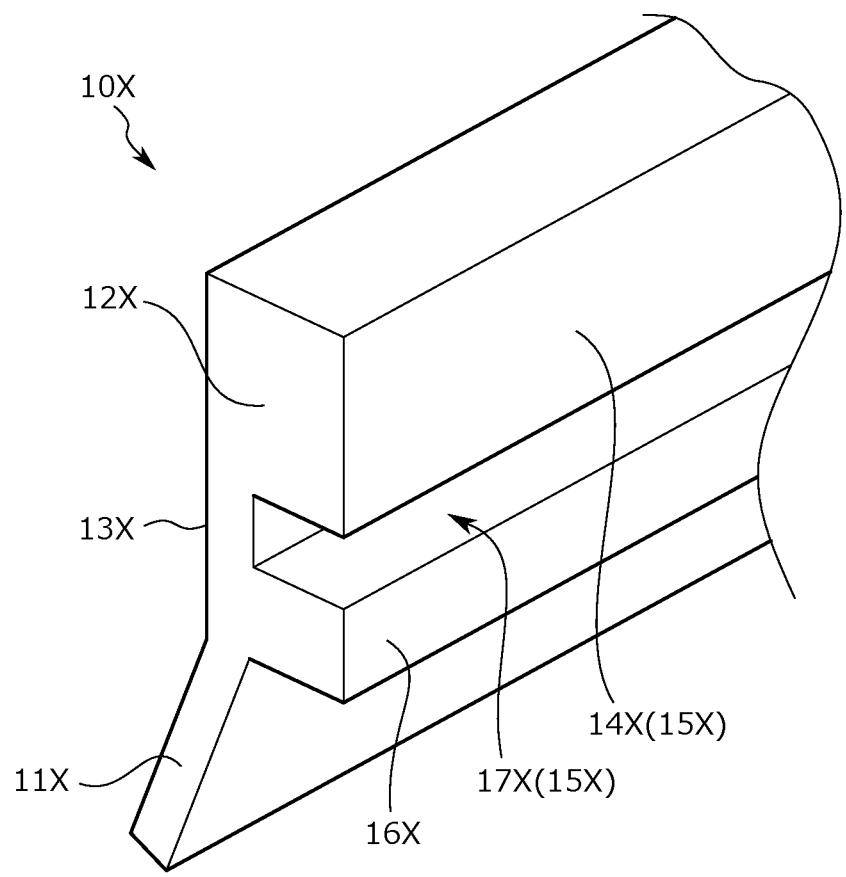
FIG. 8 is an explanatory diagram illustrating a cross-section of a first fixing member according to a modified example of the embodiment of the present invention.
Figure 8:
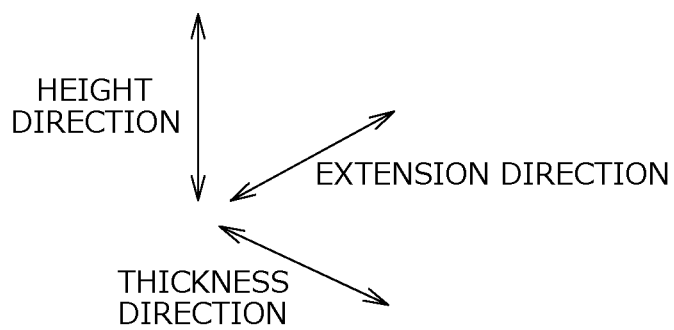

The present invention is not limited to the above-described embodiment. Hereinafter, a modified example of the first fixing member will be described with reference to FIG. 8. FIG. 8 is an explanatory diagram illustrating a cross-section of a first fixing member 10X according to a modified example of the embodiment of the present invention.

As illustrated in FIG. 8, the first fixing member 10X according to the modified example has a configuration in which a first connection portion 11X is bent toward the side opposite to the protruding direction of the insertion portion 12X. According to such a configuration, it is possible to improve a locking force between a first locking portion 16 of the insertion portion 12X and a second locking portion 24 (a locking end portion 24a) of a holding portion 21 due to the repulsive force caused by the bending of the first connection portion 11X of the insertion portion 12X while the insertion portion 12X of the first fixing member 10X is held by a holding portion 21 of the second fixing member 20.

Since the first connection portion 11X is bent at the boundary between a first locking portion 16X and the first connection portion 11X, the first connection portion 11X is easily bent when a force is input thereto. Since the end portion of the first connection portion 11X protrudes toward the first cover material T1 in relation to the cover material contact surface 13X in the thickness direction, it is possible to suppress a gap between the first fixing member 10X and the second fixing member 20 from being exposed by burying the gap between the first fixing member 10X and the second fixing member 20 while the first fixing member 10X according to the modified example is held by the second fixing member 20.

In the above-described embodiment, an example has been described in which the cover material fixing device K is used to fix the back cover material S22 of the seat back S2 to the back pad S21, but the cover material fixing device K can be also used to fix the cushion cover material S12 of the seat cushion S1 to the cushion pad S11.

Further, if the cover material fixing device K according to the embodiment is disposed on the groove portion of the fixed member such as the cushion pad S11 or the back pad S21, the application target is not limited.

As described above, the cover material fixing device according to the embodiment has been described by exemplifying the vehicle seat mounted on the vehicle. The application of the cover material fixing device according to the embodiment is not limited to the vehicle seat and the application is not particularly limited if the pad member is covered with the cover member. For example, the cover material fixing device of the present invention can be also used for ordinary seats used in facilities and buildings or conveyance seats used in conveyances other than vehicles.

Further, the cover material fixing device according to the embodiment can be applied to one other than the seat if the cover material is fixed to the fixed member and can be also applied to, for example, furniture such as beds and sofas.

REFERENCE SIGNS LIST

S: vehicle seat (conveyance seat)
S1: seat cushion
   S11: cushion pad (fixed member)
   S12: cushion cover material
S2: seat back
   S21: back pad (fixed member)
   M: groove portion
   S22: back cover material
   S23: back frame
   S24: backboard
S3: headrest
K: cover material fixing device
10, 10X: first fixing member
   11, 11X: first connection portion
   12, 12X: insertion portion
   13, 13X: cover material contact surface
   14, 14X: protruding surface (rotation restricting portion)
   15, 15X: rotation restricting portion 16, 16X: first locking portion
17, 17X: concave portion (rotation restricting portion)
T1: first cover material
20: second fixing member
  21: holding portion
  22: base portion
    22a: second connection portion
    22b: contact surface
  23: extension portion
  24: second locking portion
    24a: locking end portion
  25: first curved portion
  26: second curved portion
T2: second cover material
h: suture line

The invention claimed is:

1. A cover material fixing device, comprising:
a first fixing member that is formed in a plate shape, and includes a first connection portion provided at a first end portion of the first fixing member and an insertion portion formed at a second end portion of the first fixing member, wherein the first fixing member is connected to a first cover material at the first connection portion; and
a second fixing member that is disposed on a groove portion of a fixed member, is provided along the first fixing member, and includes a holding portion holding the insertion portion,
wherein the insertion portion is inserted and engaged with the holding portion so that the first cover material is fixed to the fixed member,
wherein the insertion portion of the first fixing member includes a rotation restricting portion for the holding portion, and
wherein the insertion portion includes a cover material contact surface which is formed on one surface in a thickness direction of the first fixing member to be in contact with the first cover material and a protruding surface which is formed on a surface on a side opposite to the cover material contact surface in the thickness direction of the first fixing member and protrudes toward the side opposite to the cover material contact surface.

2. The cover material fixing device according to claim 1, wherein the insertion portion is fitted and held by the holding portion in the thickness direction of the first fixing member.

3. The cover material fixing device according to claim 1, wherein the first fixing member includes a first locking portion which is formed between the insertion portion and the first connection portion to protrude toward the same side as that of the protruding surface,
wherein the second fixing member includes a locking end portion which is formed at an end portion disposed on the side facing the protruding surface to protrude toward the first fixing member while the insertion portion is held by the holding portion, and
wherein the locking end portion engages a concave portion between the insertion portion and the first locking portion.

4. The cover material fixing device according to claim 1, wherein the holding portion includes a base portion which is supported while being in contact with the groove portion, an extension portion which extends from the base portion in the thickness direction of the first fixing member, and a second locking portion which is bent from the extension portion, extends in substantially parallel to the base portion, and locks the insertion portion,
wherein, in the insertion portion, a surface on the side of the first cover material is formed in substantially parallel to a surface on the side opposite to the first cover material, and
wherein, in the insertion portion, a surface on the side of the first cover material is in contact with the base portion and a surface on the side opposite to the first cover material is in contact with the second locking portion between the base portion and the second locking portion.

5. The cover material fixing device according to claim 1, wherein the first connection portion is formed to be thinner than the insertion portion in the thickness direction of the first fixing member.

6. The cover material fixing device according to claim 1, wherein the second fixing member is connected to a second cover material different from the first cover material at a second connection portion, and
wherein the second cover material is disposed between the first fixing member and the second fixing member and extends to a position where the insertion portion and the holding portion overlap each other in a height direction of the first fixing member.

7. The cover material fixing device according to claim 6, wherein the first cover material and the second cover material are inserted between the second fixing member and the first fixing member, and
wherein an elastic slab is provided as a backing cloth on a back surface side of at least one of the first cover material and the second cover material.

8. The cover material fixing device according to claim 1, wherein the first connection portion of the first fixing member is bent in a direction opposite to the protruding direction of the insertion portion.

9. A conveyance seat, comprising:
the cover material fixing device according to claim 1;
a seat back; and
a seat cushion,
wherein the seat back includes a back frame, a back pad placed on the back frame, and a back cover material covering the back pad,
wherein the seat cushion includes a cushion frame, a cushion pad placed on the cushion frame, and a cushion cover material covering the cushion pad,
wherein the fixed member is the back pad or the cushion pad, and
wherein a contact surface in which the second fixing member is in contact with the fixed member is disposed between the insertion portion and the back frame or the cushion frame.

10. The cover material fixing device according to claim 1, wherein the first fixing member includes a concave portion provided on the side opposite to the cover material contact surface in the thickness direction of the first fixing member and recessed from the protruding surface toward the cover material contact surface, and
wherein the second fixing member includes a locking end portion fitted to the concave portion.

11. The cover material fixing device according to claim 1, wherein the first fixing member includes a first locking portion that is formed between the insertion portion and the first connection portion and that protrudes toward the same side as the side toward which the protruding surface protrudes, and wherein the insertion portion is larger than the first locking portion in a height direction of the first fixing member.

12. The cover material fixing device according to claim 1, wherein the first cover material is disposed between the first fixing member and the second fixing member and extends to a position where the insertion portion and the holding portion overlap each other in a height direction of the first fixing member.

13. The cover material fixing device according to claim 1, wherein the second fixing member includes a base portion configured to contact the groove portion of the fixed member to be supported by the groove portion, and
wherein the cover material contact surface of the first fixing member is flat and adjacent to the base portion of the second fixing member through the first cover material.

14. The cover material fixing device according to claim 1, wherein the second fixing member includes a base portion configured to contact the groove portion of the fixed member to be supported by the groove portion, an extension portion which extends from the base portion in the thickness direction of the first fixing member, and a second locking portion which is bent from the extension portion and extends in substantially parallel to the base portion,
wherein a first curved portion is formed between the base portion and the extension portion and a second curved portion is formed between the extension portion and the second locking portion in the second fixing member, and
wherein a curvature radius of the first curved portion is larger than a curvature radius of the second curved portion.

15. A cover material fixing device, comprising:
a first fixing member that is formed in a plate shape, and includes a first connection portion provided at a first end portion of the first fixing member and an insertion portion formed at a second end portion of the first fixing member, wherein the first fixing member is connected to a first cover material at the first connection portion; and
a second fixing member that is disposed on a groove portion of a fixed member, is provided along the first fixing member, and includes a holding portion holding the insertion portion,
wherein the insertion portion is inserted and engaged with the holding portion so that the first cover material is fixed to the fixed member,
wherein the insertion portion of the first fixing member includes a rotation restricting portion for the holding portion,
wherein the second fixing member is connected to a second cover material different from the first cover material at a second connection portion of the second fixing member, and
wherein the second cover material is disposed between the first fixing member and the second fixing member and extends to a position where the insertion portion and the holding portion overlap each other in a height direction of the first fixing member.

16. The cover material fixing device according to claim 15,
wherein the first cover material and the second cover material are inserted between the second fixing member and the first fixing member, and
wherein an elastic slab is provided as a backing cloth on a back surface side of at least one of the first cover material and the second cover material.

17. The cover material fixing device according to claim 15,
wherein the first fixing member includes a cover material contact surface which contacts the first cover material,
wherein the second fixing member includes a base portion configured to contact the groove portion of the fixed member to be supported by the groove portion, and
wherein the cover material contact surface of the first fixing member is flat and adjacent to the base portion of the second fixing member through the first cover material and the second cover material.

18. A method for manufacturing a conveyance seat, wherein the conveyance seat comprises:
a seat back that includes a back frame, a back pad placed on the back frame, and a back cover material covering the back pad;
a seat cushion that includes a cushion frame, a cushion pad placed on the cushion frame, and a cushion cover material covering the cushion pad; and
a cover material fixing device,
wherein the cover material fixing device includes:
a first fixing member that is formed in a plate shape and includes a first connection portion provided at a first end portion of the first fixing member and an insertion portion formed at a second end portion of the first fixing member, wherein the first fixing member is connected to a first cover material at the first connection portion; and
a second fixing member that is disposed on a groove portion of a fixed member, is provided along the first fixing member, and includes a holding portion holding the insertion portion,
wherein the insertion portion is inserted and engaged with the holding portion so that the first cover material is fixed to the fixed member,
wherein the insertion portion of the first fixing member includes a rotation restricting portion for the holding portion, and
wherein the insertion portion includes a cover material contact surface which is formed on one surface in a thickness direction of the first fixing member to be in contact with the first cover material and a protruding surface which is formed on a surface on a side opposite to the cover material contact surface in the thickness direction of the first fixing member and protrudes toward the side opposite to the cover material contact surface,
the method comprising:
disposing the second fixing member on the groove portion of the fixed member; and
inserting the insertion portion of the first fixing member to the holding portion of the second fixing member to be engaged with the holding member to fix the first cover material to the fixed member,
wherein the fixed member and the first cover material are the back pad and the back cover material, or the cushion pad and the cushion cover material.

* * * * *